Figure 1:
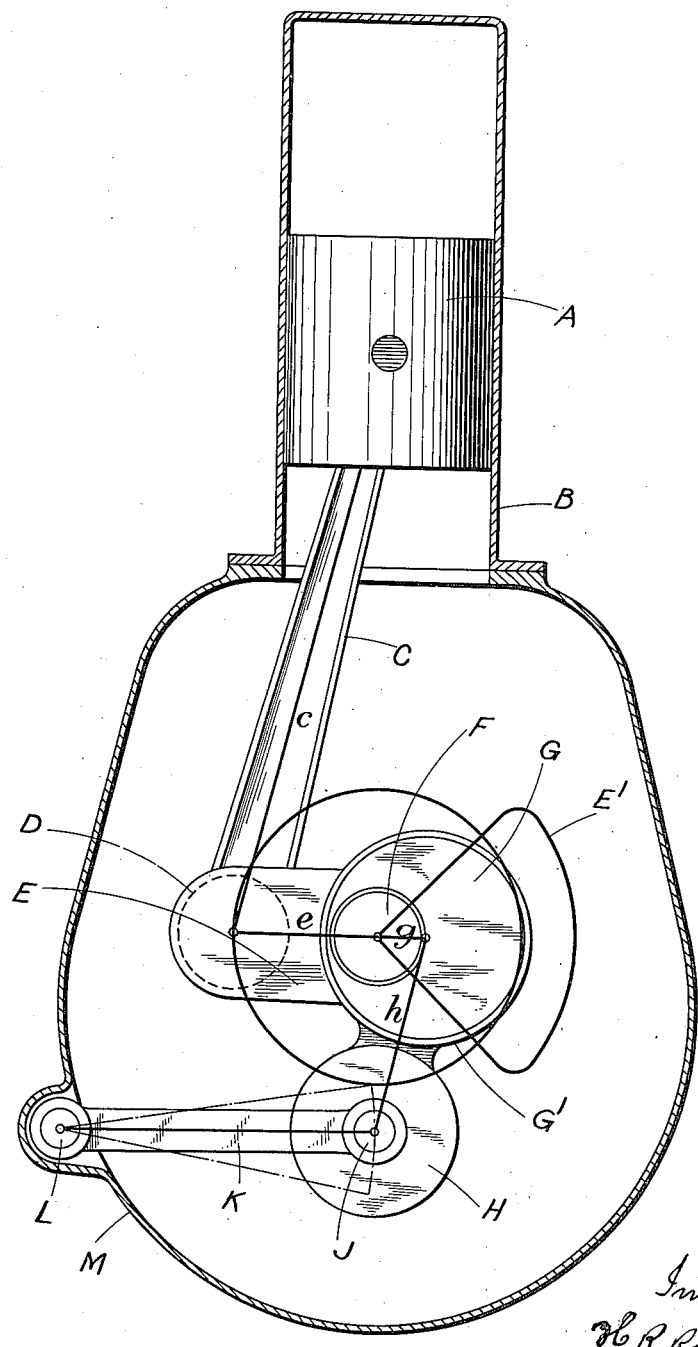

H. R. RICARDO.
BALANCING OF RECIPROCATING ENGINES.
APPLICATION FILED MAR. 4, 1919.

1,310,090.

Patented July 15, 1919.
2 SHEETS—SHEET 1.

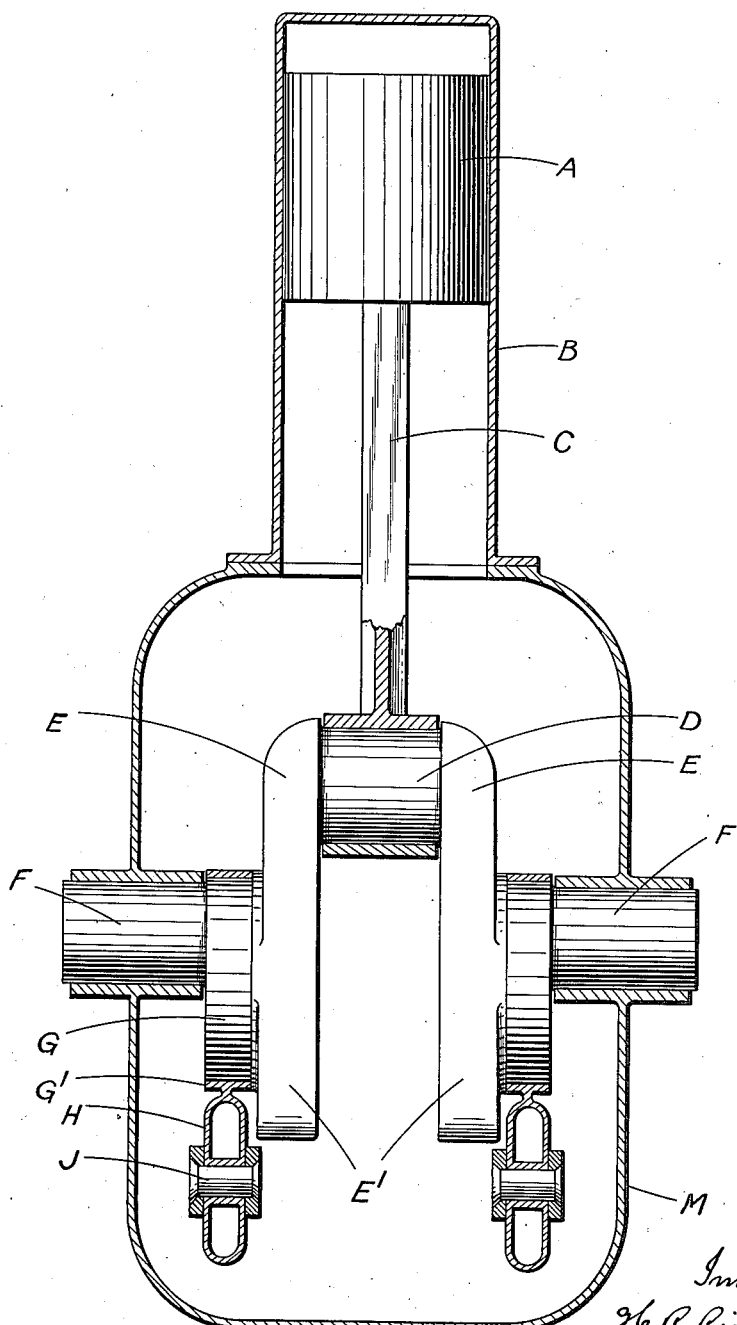

UNITED STATES PATENT OFFICE.

HARRY RALPH RICARDO, OF LONDON, ENGLAND.

BALANCING OF RECIPROCATING ENGINES.

1,310,090.　　　　Specification of Letters Patent.　　Patented July 15, 1919.

Application filed March 4, 1919. Serial No. 280,638.

*To all whom it may concern:*

Be it known that I, HARRY RALPH RICARDO, subject of the King of England, and residing at London, in England, have invented certain new and useful Improvements in the Balancing of Reciprocating Engines, of which the following is a specification.

This invention relates to the balancing of reciprocating engines of the type having one or more cylinders which act on a crank shaft with a single throw crank and has for its object to enable not only the primary but also the secondary forces to be adequately balanced.

According to this invention two masses are mounted so that they can reciprocate substantially radially with relation to the crank shaft and these masses are disposed in line with either side of the crank and on that side of the crank shaft which is remote from the cylinder or cylinders. Two crank members are formed or mounted on the shaft adjacent to the crank webs and these crank members are operative solely to reciprocate the two masses in opposite phase to the working piston or pistons which act on the crank. These crank members are conveniently formed as a pair of eccentrics whose throw is opposite to that of the main crank at the sides of which these eccentrics are respectively mounted on the crank shaft. The eccentrics are connected to a pair of weights which are constrained by links or rocking arms so as to reciprocate substantially radially with relation to the crank shaft. The ratio of the throw of each eccentric to the distance between the center of this eccentric and the center of gravity of the weights to which the eccentric is connected is equal to the ratio of the throw of the main crank to the length of the piston connecting rod. Further the ratio between the weight of the masses that are reciprocating, that is to say the piston and connecting rod on the one side of the crank shaft and the counter weights on the other side thereof, must be inversely proportional to the strokes through which these masses reciprocate. Conveniently two rocking arms are employed to control the reciprocating movement of the weights and each of these arms is pivotally connected at one end to the weight at a point at or near the center of gravity of the weight. At its other end each rocking arm is pivoted to some fixed point situated toward one side of the crank shaft.

The accompanying drawings illustrate diagrammatically and by way of example one construction in accordance with the invention. In these drawings, Figure 1 is a part sectional diagrammatic elevation of a single cylinder engine the view being taken from the end of the crank shaft and lines being drawn through the centers to illustrate the ratios of the parts.

Fig. 2 is a part sectional elevation of the same engine the crank shaft being shown in side elevation and other parts in section on a plane cutting the crank shaft axis.

Like letters indicate like parts throughout the drawings.

The piston A reciprocates in a cylinder B and is coupled by a connecting rod C to a crank pin D disposed between webs E mounted on a crank shaft F. On the outer side of each web E is arranged an eccentric G whose strap G' is connected to a weight H which is pivotally carried on a pin J at one end of a link K the other end of which is pivoted at L toward one side of the crank shaft on some fixed part for example on the crank case M. The pivot pins J are preferably positioned in the weights G so as to be coincident with the centers of gravity of these weights. The throw $g$ of each eccentric G and the distance $h$ between the center of each eccentric and the center of gravity of the weight H to which it is connected are so proportioned in relation to the throw $e$ of the main crank and the length $c$ of the connecting rod that $$\frac{g}{h} = \frac{e}{c}.$$

Further the ratio between the weights of the masses which are reciprocated on either side of the crank shaft, that is to say on the one hand the primary masses which comprise the piston A and connecting rod C and on the other hand the secondary masses which comprise the counter weights H and links K, must be so determined that these weights are inversely proportional to the strokes $e$ and $g$ through which these masses are respectively reciprocated.

By thus proportioning the parts in this construction the weights H are reciprocated in opposite phase to the piston and both the primary and also the secondary disturbing forces will be balanced. It will be seen that by making the rocking link K of sufficient length and the throw $g$ of the eccentric, that is to say the stroke of the weights, relatively short, the arc through which the weights are reciprocated can be approximated to a straight line. Other forms of linkage may also be employed which will enable the weights to be reciprocated substantially radially with respect to the crank shaft axis or the weights may be arranged to move in guides suitably disposed. It is desirable however to avoid if possible the friction resultant from the use of guides.

Where the center of gravity of the main reciprocating mass, that is to say the piston A and connecting rod C, is not coincident with the gudgeon pin but lies at some point in the connecting rod beyond the gudgeon pin so that this center of gravity describes an ellipse instead of a straight line, the construction may be modified so that the center of gravity of each counter weight H will be compelled to follow a similar and opposing elliptical path. This may be effected by connecting the rocking link K to the weight H at a point slightly below the center of gravity of the weight. In this way the common center of gravity of the two groups of reciprocating masses which are situated on either side of the crank shaft can be maintained coincident with the center of the crank shaft under all circumstances and a perfect mathematical balance can be obtained.

The crank webs are conveniently balanced by counter weights E′ arranged in the usual manner and formed integral with the webs E.

The invention may be applied to engines provided with more than one cylinder if the pistons in all the cylinders act on a single crank pin. The details of construction may be modified to meet requirements.

What I claim as my invention and desire to secure by Letters Patent is:—

1. In an internal combustion engine the combination with a crank shaft having a single throw crank, a piston reciprocating in a cylinder and connected to this crank, two masses which are mounted so that they can reciprocate substantially radially with relation to the crank shaft axis these masses being disposed one on either side of the crank in the axial direction and at the side of the shaft remote from the cylinder, and two crank members mounted on the crank shaft adjacent to the two crank webs and connected respectively to the two masses these crank members being operative solely to reciprocate the two masses in opposite phase to the piston which acts on the main crank, the ratio between the weights of the piston and other masses which are thus reciprocated on the opposite sides of the crank shaft being inversely proportional to the strokes through which they reciprocate as set forth.

2. In an internal combustion engine the combination with a crank shaft having a single throw crank, a piston reciprocating in a cylidner and connected to this crank, two eccentrics mounted on the crank shaft on either side of the main crank, a pair of weights respectively connected to these eccentrics and disposed at the side of the crank shaft remote from the piston, and two rocking arms each pivotally connected at one end to one of the weights and at the other end to a fixed point situated toward one side of the crank shaft as set forth.

3. In an internal combustion engine the combination with a crank shaft having a single throw crank, a piston reciprocating in a cylinder, a connecting rod connecting this piston to the crank, two eccentrics mounted on the crank shaft on either side of the main crank, a pair of weights respectively connected to these eccentrics and disposed at the side of the crank shaft remote from the piston, the ratio of the throw of each eccentric to the distance between its center and the center of gravity of the weight to which the eccentric is connected being equal to the ratio of the throw of the main crank to the length of the piston connecting rod, and two rocking arms each pivotally connected at one end to one of the weights at or near its center of gravity and at the other end to a fixed point situated toward one side of the crank shaft as set forth.

In testimony whereof I have signed my name to this specification.

HARRY RALPH RICARDO.